US008806650B2

(12) United States Patent
Kraemer et al.

(10) Patent No.: US 8,806,650 B2
(45) Date of Patent: *Aug. 12, 2014

(54) METHODS AND APPARATUS PROVIDING AUTOMATIC SIGNATURE GENERATION AND ENFORCEMENT

(71) Applicant: Cisco Technology Inc., San Jose, CA (US)

(72) Inventors: Jeffrey A. Kraemer, Wellesley, MA (US); Andrew Zawadowskiy, Nashua, NH (US); Philip J. S. Gladstone, Carlisle, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/949,173

(22) Filed: Jul. 23, 2013

(65) Prior Publication Data
US 2013/0312104 A1    Nov. 21, 2013

Related U.S. Application Data

(63) Continuation of application No. 11/414,909, filed on May 1, 2006, now Pat. No. 8,495,743.

(60) Provisional application No. 60/751,439, filed on Dec. 16, 2005.

(51) Int. Cl.
*H04L 29/06* (2006.01)

(52) U.S. Cl.
USPC .................. 726/25; 726/13; 726/14; 726/22; 726/23; 709/224; 713/160

(58) Field of Classification Search
USPC .................. 726/13, 14, 25; 713/160; 709/224
See application file for complete search history.

(56) References Cited

U.S. PATENT DOCUMENTS

| 8,413,245 B2 | 4/2013 | Kraemer et al. | |
| 8,613,096 B2 * | 12/2013 | Peinado et al. | 726/25 |
| 2002/0078381 A1 | 6/2002 | Farley et al. | |

FOREIGN PATENT DOCUMENTS

| WO | WO 02/14989 | 2/2002 |
| WO | WO 02/103498 | 12/2002 |
| WO | WO 03/058451 | 7/2003 |

OTHER PUBLICATIONS

"Panorama: capturing system-wide information flow for malware detection and analysis"; Yin et al; 14th ACM conference, 2007; 13 pages.*
Government of India Patent Office, "Examination Report" in application No. 2998/CHENP/2007, dated Dec. 27, 2013, 2 pages.
Current Claims in application No. 2998/CHENP/2007, dated Dec. 2013, 43 pages.

* cited by examiner

*Primary Examiner* — Jason Lee
(74) *Attorney, Agent, or Firm* — Hickman Palermo Truong Becker Bingham Wong LLP

(57) ABSTRACT

A system inserts at least one notifying identifier in the computer system. The at least one notifying identifier provides execution information associated with the computer system. The system receives execution information from the at least one notifying identifier, the execution information identifies details associated with a traffic flow on the computer system. The system then generates a signature based on a deterministic link provided by the execution information provided by the at least one notifying identifier. The signature is utilized to prevent further damage caused to the computer system by at least one attack.

19 Claims, 13 Drawing Sheets

```
Signature:
substring:
       0000:  05 00 01 00 00 00 00 00 00 00 00 00 58 7D 75 75 40 EB C6 47 BC 71 4E A7 1C D0 B5 97 00 00 00 00
       0032:  00 00 00 00 00 00 00 00 00 00 00 00 00 00 00 00 00 00 09 00 00 00 03 00 00 00 00 00 00 03 00 00
       0064:  5C 00 5C 00
substring:
       0000:  EB 10 EB 19 9F 75 18 00 23 37 F3 77 EB E0 FD 7F
substring:
       0000:  EB 04 FF FF FF FF
substring:
       0000:  EB 04 EB 04
substring:
       0000:  EB 04 FF FF FF FF
substring:
       0000:  6A 48 59 D9 EE D9 74 24 F4 5B 81 73 13
substring:
       0000:  83 EB FC E2 F4
substring:
       0000:  F3 16 FF 74 0D 24 6A 77 E9 87 FC FF FF E9 7A FC FF FF
substring:
       0000:  8B 45 30 05 24 FB FF FF E0 EB F4
substring:
       0000:  0B 0B 1B 00
substring:
       0000:  59 1C 00 01 8B 44 24 FC 05 E0 FA FF FF FF E0
       0000:  5C 00 41 00 00 00 00 00 00 00 00 00 02 00 00 00 00 00 46 00 00 00 01 00 00 00 00 00 68 1C 09 00 01 00
       0032:  00 00 00 00 00 00 00 00 00 00 00 00 00 00 00 00 00 00 00 00 C0 00 00 00 00 00 00 00 00 00 07 00
```

203 INSERT AT LEAST ONE NOTIFYING IDENTIFIER IN THE COMPUTER SYSTEM, THE AT LEAST ONE NOTIFYING IDENTIFIER PROVIDING EXECUTION INFORMATION ASSOCIATED WITH THE COMPUTER SYSTEM

204 UTILIZE THE AT LEAST ONE NOTIFYING IDENTIFIER TO FILTER DATA PROCESSING ON THE COMPUTER SYSTEM

OR

205 CONTROL A BEHAVIOR OF AT LEAST ONE APPLICATION ON THE COMPUTER SYSTEM BY THE INSERTION OF THE AT LEAST ONE NOTIFYING IDENTIFIER IN THE COMPUTER SYSTEM

FIG. 8

211 GENERATE A SIGNATURE BASED ON A DETERMINISTIC LINK PROVIDED BY THE EXECUTION INFORMATION PROVIDED BY THE AT LEAST ONE NOTIFYING IDENTIFIER, THE SIGNATURE UTILIZED TO PREVENT FURTHER DAMAGE CAUSED TO THE COMPUTER SYSTEM BY AT LEAST ONE ATTACK

212 GENERATE THE SIGNATURE BY MATCHING THE SIGNATURE AGAINST AT LEAST A PORTION OF A DATA PAYLOAD ASSOCIATED WITH THE AT LEAST ONE ATTACK

213 GENERATE THE SIGNATURE BY MATCHING THE SIGNATURE EXACTLY AGAINST THE AT LEAST ONE ATTACK

*FIG. 10*

213 GENERATE THE SIGNATURE BY MATCHING THE SIGNATURE AGAINST AT LEAST A PORTION OF A DATA PAYLOAD ASSOCIATED WITH THE AT LEAST ONE ATTACK

214 REFINE THE SIGNATURE UTILIZING THE TRAFFIC FLOW ON THE COMPUTER SYSTEM TO GENERATE THE SIGNATURE

215 RECEIVE THE PLURALITY OF DATA PAYLOADS FROM AT LEAST ONE COMPUTER SYSTEM TO CREATE AN OPTIMAL SIGNATURE THAT IS OPERATIONAL ON THE AT LEAST ONE COMPUTER SYSTEM

FIG. 11

216 RECEIVE THE PLURALITY OF DATA PAYLOADS FROM AT LEAST ONE COMPUTER SYSTEM TO CREATE AN OPTIMAL SIGNATURE THAT IS OPERATIONAL ON THE AT LEAST ONE COMPUTER SYSTEM

217 IDENTIFY AN ORDERED SEQUENCE OF AT LEAST ONE SUB STRING FROM THE PLURALITY OF DATA PAYLOADS ON THE AT LEAST ONE COMPUTER SYSTEM

OR

218 IDENTIFY A COMMON SUB STRING FROM THE PLURALITY OF DATA PAYLOADS ON THE AT LEAST ONE COMPUTER SYSTEM

OR

219 IDENTIFY A COLLECTION OF SUB STRINGS FROM SOME OF THE PLURALITY OF DATA PAYLOADS ON THE AT LEAST ONE COMPUTER SYSTEM

220 ASSIGN A PROBABILITY TO EACH OF THE SUB STRINGS WITHIN THE COLLECTION OF SUB STRINGS

221 ASSOCIATE THE PROBABILITY TO A LIKELIHOOD THAT A DATA PAYLOAD ASSOCIATED WITH EACH OF THE SUB STRINGS IS ONE OF THE GROUP CONSISTING OF A GOOD DATA PAYLOAD AND A BAD DATA PAYLOAD

*FIG. 12*

222 GENERATE A SIGNATURE BASED ON A DETERMINISTIC LINK PROVIDED BY THE EXECUTION INFORMATION PROVIDED BY THE AT LEAST ONE NOTIFYING IDENTIFIER, THE SIGNATURE UTILIZED TO PREVENT FURTHER DAMAGE CAUSED TO THE COMPUTER SYSTEM BY AT LEAST ONE ATTACK

223 RECEIVE A DATA PAYLOAD ON THE COMPUTER SYSTEM

224 COMPARE THE DATA PAYLOAD TO THE SIGNATURE

225 DENY THE DATA PAYLOAD ACCESS TO THE COMPUTER SYSTEM BASED ON THE COMPARISON OF THE DATA PAYLOAD TO THE SIGNATURE

FIG. 13

METHODS AND APPARATUS PROVIDING AUTOMATIC SIGNATURE GENERATION AND ENFORCEMENT

CROSS REFERENCE TO RELATED APPLICATIONS

The present application claims the benefit of U.S. Provisional Patent Application No. 60/751,439, filed on Dec. 16, 2005, which is incorporated herein by reference.

BACKGROUND

Computer systems, networks and data centers are exposed to a constant and differing variety of attacks that expose vulnerabilities of such systems in order to compromise their security and/or operation. As an example, various forms of malicious software program attacks include viruses, worms, Trojan horses and the like that computer systems can obtain over a network such as the Internet. Quite often, users of such computer systems are not even aware that such malicious programs have been obtained within the computer system. Once resident within a computer, a malicious program that executes might disrupt operation of the computer to a point of inoperability and/or might spread itself to other computers within a network or data center by exploiting vulnerabilities of the computer's operating system or resident application programs. Other malicious programs might operate within a computer to secretly extract and transmit information within the computer to remote computer systems for various suspect purposes. As an example, spyware is a form of software that can execute in the background (e.g., unbeknownst to users) of a computer system and can perform undesirable processing operations such as tracking, recording and transmitting user input from the spyware-resident computer system to a remote computer system. Spyware can allow remote computes to silently obtain otherwise confidential information such as usernames and passwords required to access protected data, lists, contents of files or even remote web sites user account information.

Computer system developers, software developers and security experts have created many types of conventional preventive measures that operate within conventional computer systems in an attempt to prevent operation of malicious programs from stealing information or from compromising proper operation of the computer systems. As an example, conventional virus detection software operates to periodically download a set of virus definitions from a remotely located server. Once the virus detection software obtains the definitions, the security software can monitor incoming data received by the computer system, such as email messages containing attachments, to identify viruses defined within the virus definitions that might be present within the data accessed by the computer. Such data might be obtained over a network or might be unknowingly resident on a computer readable medium, such as a disk or CD-ROM that a user inserts into the computer. Upon detection of inbound data containing a virus or other malicious program, the virus detection software can quarantine the inbound data so that a user of the computer system will not execute code or access the data containing the detected virus that might result in compromising the computer's operation.

Other examples of conventional malicious attacks, intrusions, or undesirable processing that can cause problems within computer systems or even entire computer networks include virus attacks, worm attacks, trojan horse attacks, denial-of-service attacks, a buffer overflow operations, execution of malformed application data, and execution of malicious mobile code. Virus attacks, worm attacks, and trojan horse attacks are variants of each other that generally involve the execution of a program, for which a user often is unaware of its existence, that performs some undesired processing operations to comprise a computer's proper operation. A denial-of-service attack operates to provide an intentional simultaneous barrage of data payloads (e.g., many connection attempts) emanating from many different computer systems to one or more target computer systems, such as a web site, in order to intentionally cause an overload in processing capabilities of the target computer resulting in disruption of service or a business function provided by the target computer. Denial of Service attacks may also seek to crash the targeted machine (rather than simply consume resources). Buffer overflow attacks occur when programs do not provide appropriate checks of data stored in internal data structures within the software that result in overwriting surrounding areas of memory. Attacks based on buffer overflows might allow an attacker to execute arbitrary code on the target system to invoke privileged access, destroy data, or perform other undesirable functions. Malformed application data attacks might result in an application containing a code section that, if executed, provides access to resources that would otherwise be private to the application. Such attacks can expose vulnerabilities due to an incorrect implementation of the application, for example by failing to provide appropriate data validity checks, or allowing data stream parsing errors, and the like.

Many of the conventional malicious programs and mechanisms for attack of computer systems, such as viruses and worms, include the ability to redistribute themselves to other computer systems or devices within a computer network, such that several computers become infected and experience the malicious processing activities discussed above. Some conventional attempts to prevent redistribution of malicious programs include implementing malicious program detection mechanisms such as virus detection software within firewalls or gateways between different portions of networked computer systems in order to halt propagation of malicious programs to sub-networks.

SUMMARY

Conventional technologies for providing computer security suffer from a variety of deficiencies. In particular, conventional technologies for providing computer security are limited in that conventional security software programs rely on the ability to periodically remotely receive information such as virus definitions that allow the conventional security software programs to identify and quarantine malicious programs. Many of the most common conventional forms of security software such as virus definitions programs rely upon obtaining the periodic virus definition updates from a centralized server accessed over the Internet that is maintained by the vendor of the security software. As a result, the most recent virus definition updates only reflects those viruses that have been recently detected, fingerprinted in inserted into the virus definition file by the vendor of that maintains and distributes the virus definition files.

Because conventional security software programs require periodic updates, such conventional security software programs are only as good as the most recent updates of the malicious program definitions (e.g., virus definitions) that individual instances of the conventional protection software have been able to receive. As an example, conventional virus detection software will not recognize viruses created and transmitted to a computer system that have not yet been identified and/or defined within the most recent update of a set of virus definitions obtained from a remote server. Accordingly, the malicious program code or data not defined within the most recent virus definitions update may be successfully inserted and executed within computer systems in a network in order to perform some of the malicious processing discussed above, even though such systems are equipped with conventional security software (i.e., virus detection software).

As a result, conventional security software program implementations are often several steps behind the prevention and spread of new attacks that are constantly being created and disseminated by malicious program developers. This problem is compounded by the fact that modern malicious programs are able to distribute themselves quickly to hundreds or thousands of computer systems on a network such as the Internet within a short amount of time, such as several hours, whereas most conventional security software only obtains updates on a less frequent basis, such as nightly.

Embodiments disclosed herein significantly overcome such deficiencies and provide a system that includes a automatic signature security technique. It should be noted that the automatic signature security technique could also be an automatic signature security algorithm or an automatic signature security process. The automatic signature security technique rapidly identifies malicious attacks and prevents the spread of such attacks to other computer systems. In effect, embodiments disclosed herein provide for a self-healing computer network system. Embodiments disclosed herein include one or more security agents that operate within individual host computer systems in a network. The security agents can interact with a management center to obtain a security policy that contains a set of rules that indicate types of operations that may be allowed or disallowed within computer system. Once a security agent has obtained the security policy, the security agent operates a plurality of security interceptors that can watch over and monitor processing operations performed by various software and hardware components within the host computer system that that security agent protects. The security agent provides security to a computerized device by detecting processing outcomes produced via operation of a sequence of related processing operations within the computerized device. As an example, processing operations related to an inbound connection to a Web server can be monitored by various interceptors operating within different parts of the computer system's operating system and application layer code in order to detect the related sequence of processing operations that the inbound Web server connection attempt triggers. Each interceptor detects a specific event and transfers that event to an event correlation engine that records the processing outcomes and the sequence of related processing operations in a security history. The event correlation engine identifies a security violation when one of the detected processing operations in the security history produces a processing outcome that violates a security policy. This may be before, during or after occurrence of an undesired processing outcome within computer system such as a system crash, system error, protection violation, process disruption or other such undesired action as defined within the security policy. The security agent is then able to subsequently detect attempted performance of a similar sequence of related processing operations that attempt to produce at least one processing outcome that violates the security policy. In response, the security agent denies operation of at least a portion of the sequence of related processing operations within the computerized device to avoid violation of the security policy. The security agents can also mark or otherwise identify sequences of processing operations that led up to the security violation as a disallowed sequence of processing operations and can disseminate this information to other security agents operating on other host computer systems in the network in real-time (e.g., upon detection) in order to spread the knowledge of the behavior or processing pattern that the malicious attack attempted to perform on the computer system the detected the attack, so that other computer systems will not be vulnerable to the attack.

Embodiments disclosed herein include a computer system executing a automatic signature security technique. The automatic signature security technique provides multiple control points (i.e., notifying identifiers) hooked into a computer system, where application or system data is about to be processed. The control points are used to filter or prevent the processing of malicious data (i.e., attacks on the computer system). Additional control points are hooked throughout the system to control application behavior. When the system or an application triggers a policy violation, where a deterministic association can be mapped from the violation back to a "data entry" control point (i.e., a buffer overflow, process exception, etc.), the data being processed by the thread is identified as an exploit (i.e., an attack) specific to that interface, to detect an attack on the computer system. The data is used to generate a signature to prevent further attacks of the exploit. The generated signature is used to filter out subsequent data processed by the affected interface. If multiple exploits occur (where the data varies) on an interface, the signature is refined to generate an optimal signature. The refinement of the signature can occur either locally (on the computer system) or globally, in the case where multiple systems report in to a central computer system.

Embodiments disclosed herein include a computer system executing a automatic signature security technique. The automatic signature security technique inserts at least one notifying identifier in the computer system. The notifying identifier provides execution information associated with the computer system. The automatic signature security technique receives execution information from the notifying identifier. The execution information identifies details associated with traffic flow on the computer system. The automatic signature security technique then generates a signature based on a deterministic link provided by the execution information provided by the notifying identifier, and the signature is utilized to prevent further damage caused to the computer system by one or more attacks on the computer system.

During an example operation of one embodiment, suppose the automatic signature security technique is monitoring a computer system. The computer system is attacked by, for example, a worm that targets MS RPC service (svchost.exe) running Microsoft Port Mapper service at port TCP/135. As result of the exploit in this service, the worm code tries to execute buffer overflow. The attempt to execute the buffer overflow is detected by Buffer Overflow detection logic, and is denied. At the same time, the automatic signature security technique determines (by information provided by the control points on the computer system) that a buffer overflow has occurred while processing network data payload. As result of this event, the data payload is classified by a classification component as "suspicious/bad", and passed to the automatic signature security technique with a tag attached. The automatic signature security technique determines this data payload is the only data payload with a "suspicious/bad" classification tag, and generates a specific signature that will only match the same exact data payload.

After a first attempt, the worm again tries to propagate using same exploit as before, but with a modification to shell portion of the data payload (this is possibly due to a real polymorphic functionality, or just some simpler modifications to the shell code so that shell code appears to be different). The worm (once again) causes a buffer overflow, and the data payload is tagged with a "suspicious/bad" classification tag. The automatic signature security technique determines this data payload is the only data payload with a "suspicious/bad" classification tag, and generates a specific signature that will only match the same exact data payload.

The automatic signature security technique now has two data payloads utilizing the same exploit, with possible modification to shell code portion. The automatic signature security technique builds a Longest Common Token Sequence signature to match both data payloads, as well as any other data payloads that may contain the same exploit. The newly generated signature eliminates the need for the previously generated signatures since the newly generated signature is a more specific signature, generated from a larger number of data payloads.

The steps of generating a more optimal signature can be repeated many times, due to the changes in the polymorphic shell code portion of the worm. Eventually, the only common portions (containing the exploit code) of the data payload result in the generation of a Longest Common Token Sequence signature (i.e., this sequence is the longest ordered set of sub strings that is common to all the data payloads used as inputs for generation of the signature). Thus, the most optimal (and specific) signature is generated, after a number of iterations. When a new data payload arrives that appears to be the same exploit as the worm, but having a shell modification, the data payload is checked against the known signatures (included the newly generated optimal signature). When a match is found, the data payload is denied access to the computer system.

Additionally, a simple signature can be generated, even after seeing a bad data payload once. This simple signature may not protect against the same exploit with a shell modification, but the simple signature, at the very least, will protect against a worm having the exactly same data payload.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 3 is an example of a first data payload containing exploit code.

FIG. 4 is an example of a second data payload containing exploit code.

FIG. 5 is an example of common sub strings within the first data payload and the second data payload, both containing common exploit code.

FIG. 6 is an example of mapping the first data payload onto the second data payload to show the overlay of a signature on the data payload depicting common areas, the common exploit code depicted in bolded font.

FIG. 8 illustrates a flowchart of a procedure performed by the system of FIG. 1 when the automatic signature security technique inserts at least one notifying identifier in the computer system, and utilizes the notifying identifier to filter data processing on the computer system, according to one embodiment disclosed herein.

FIG. 10 illustrates a flowchart of a procedure performed by the system of FIG. 1 when the automatic signature security technique generates a signature based on a deterministic link provided by the execution information provided by the at least one notifying identifier, the signature utilized to prevent further damage caused to the computer system by at least one attack, according to one embodiment disclosed herein.

FIG. 11 illustrates a flowchart of a procedure performed by the system of FIG. 1 when the automatic signature security technique generates the signature by matching the signature against at least a portion of a data payload associated with the at least one attack, according to one embodiment disclosed herein.

FIG. 12 illustrates a flowchart of a procedure performed by the system of FIG. 1 when the automatic signature security technique receives the plurality of data payloads to create an optimal signature that is operational on the computer system, according to one embodiment disclosed herein.

FIG. 13 illustrates a flowchart of a procedure performed by the system of FIG. 1 when the automatic signature security technique generates a signature based on a deterministic link provided by the execution information provided by the at least one notifying identifier, and denies access to the computer system, based on the generated signature, according to one embodiment disclosed herein.

DETAILED DESCRIPTION

Embodiments disclosed herein include a computer system executing a automatic signature security technique. The automatic signature security technique provides multiple control points hooked into a computer system, where application or system data is about to be processed. The control points are used to filter or prevent the processing of malicious data (i.e., attacks on the computer system). Additional control points are hooked throughout the system to control application behavior. When the system or an application triggers a policy violation, where a deterministic association can be mapped from the violation back to a 'data entry" control point (i.e., a buffer overflow, process exception, etc.), the data being processed by the thread is identified as an exploit (i.e., an attack) specific to that interface, to detect an attack on the computer system. The data is used to generate a signature to prevent further attacks of the exploit. The generated signature is used to filter out subsequent data processed by the affected interface. If multiple exploits occur (where the data varies) on an interface, the signature is refined to generate an optimal signature. The refinement of the signature can occur either locally (on the computer system) or globally, in the case where multiple systems report in to a central computer system.

Embodiments disclosed herein include a computer system executing a automatic signature security technique. The automatic signature security technique inserts at least one notifying identifier in the computer system. The notifying identifier provides execution information associated with the computer system. The automatic signature security technique receives execution information from the notifying identifier. The execution information identifies details associated with traffic flow on the computer system. The automatic signature security technique then generates a signature based on a deterministic link provided by the execution information provided by the notifying identifier, and the signature is utilized to prevent further damage caused to the computer system by one or more attacks on the computer system.

Figure 1:
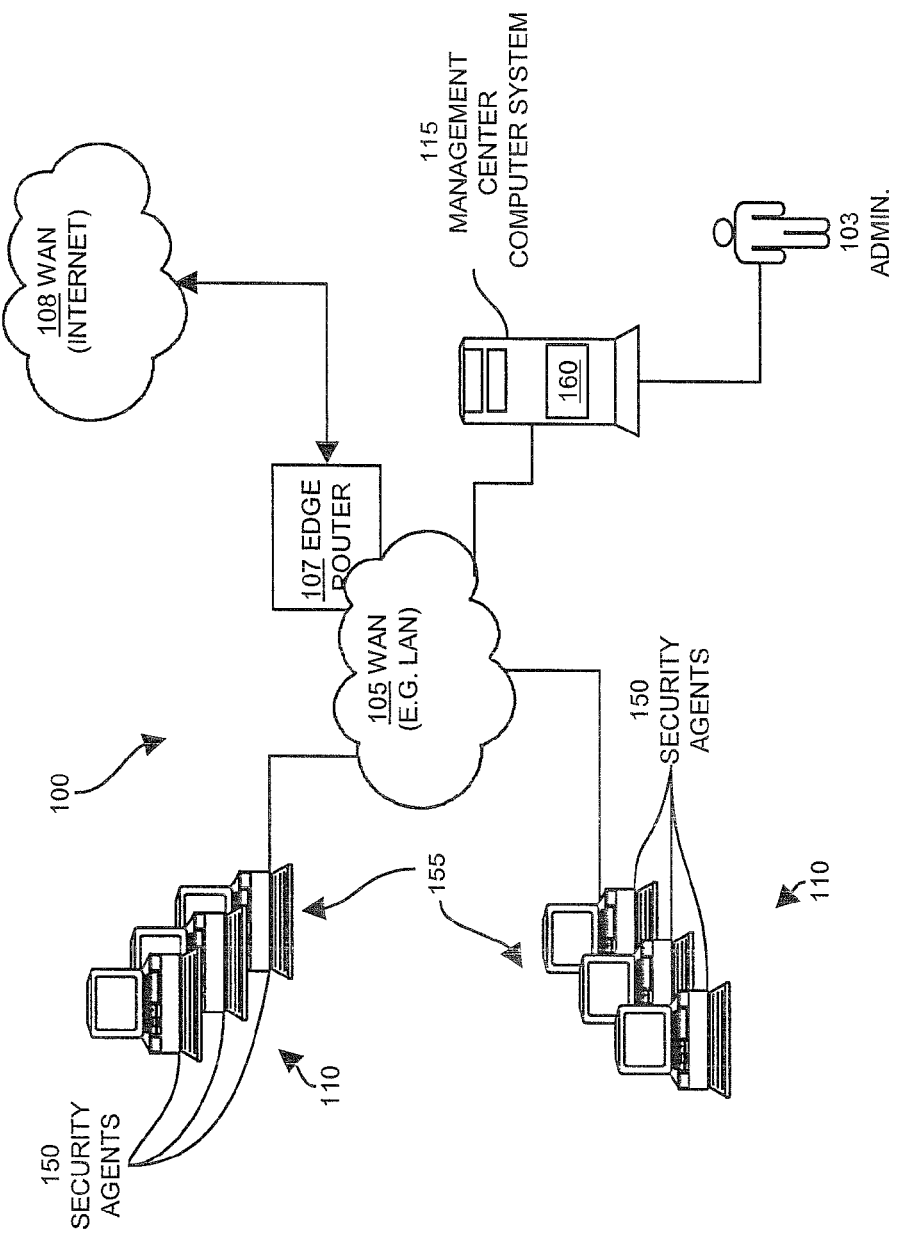
FIG. 1 illustrates an example configuration of a network environment that includes a security system configured as disclosed herein.

FIG. 1 illustrates an example computer networking environment 100 suitable for use in explaining example embodiments disclosed herein. The computer networking environment 100 includes a computer network 105 such as a local area network (LAN) that interconnects a security management computer system 115, an edge router 107 and a plurality of host computer systems 110, each of which operates (e.g., executes, runs, interprets or otherwise performs) a agent 150 configured as disclosed herein. Each agent 150 is running an instance of the automatic signature security technique 155. The security management computer system 115 also operates a management center application 160 that operates as disclosed herein. The edge router 107 couples the network 105 to a wide area network (WAN) 108 such as the Internet that allows communication between the computer systems 110, 115 and other computers worldwide. Note that the management center computer 115 may be isolated form the WAN 108 by a firewall that is not shown in this example.

The host computers 110 may be any type of computer system, workstation, server (e.g., web server), personal computer, laptop, mainframe, personal digital assistant device, general purpose or dedicated computing device or the like that operate any type of software, firmware or operating system. They may be physically or wirelessly coupled to the network 105 to support communications. The security agents 150 and management center application 160 operate to dynamically detect and prevent malicious attacks on the computers 110 without requiring the security agents 150 to continuously and periodically download signature or virus definition files. Generally, an administrator 103 installs the security agents 150 (including the automatic signature security technique 155) on the computer systems 110 that are to be protected and they are responsible for enforcing the appropriate security policy on those systems.

The security agents 150 (including the automatic signature security technique 155) have the ability to learn what causes security violations such as malicious attacks by monitoring, analyzing and recording processing behavior and events of the computer system 110 that occur prior to the security violation taking place, in order to prevent such events from occurring in the future. In other words, the security system disclosed herein in able to monitor and record processing behavior that results in an undesired processing operation such as a process exception, system crash or the like and is able to analyze recorded processing operations that led up to undesired operation or problem to identify the root cause of the failure. Once identified, the security system is able to prevent that single operation or sequence of processing operations identified as the root cause of failure from executing again on that or other computer system in order to avoid further security violations and to prevent such attacks on other computers. A security agent as disclosed herein can thus learn of new types of malicious attacks without having seen processing that causes such attacks in the past, and can prevent that attack in the future. The ability to learn of processing associated with a new attack, identify its root cause, and prevent it from happening in the future can occur without external input (e.g., virus definition files) being received by a computer system equipped with the security agent.

Security agent operation as explained herein includes being preprogrammed with certain known security violations in a rule-based security policy and preventing them from happening even a first time. In addition, such processing also involves recording and post-processing security history event data that result in a security violation (i.e., that was not preprogrammed and thus unrecognizable a first time) to identify a root cause (e.g., one or more processing operations or events) of the security violation within the computer system in order to prevent it from happening a second time. This can involve performing a local comparison of several security histories collected by a agent 150 in a single computer system 110 to identify a common pattern of processing activity that results in an undesirable processing outcome (i.e., a security violation). The security agents 150 can also transmit event and security history information to the management center 115.

The management center 115 acts as a central repository for all event log records generated by the security agents 150 and provides functions for monitoring and reporting. The management center 115 also correlates event records generated from security agents 150 operating on different computer systems 110 for purposes of detecting suspicious activity in the network.

Figure 2:
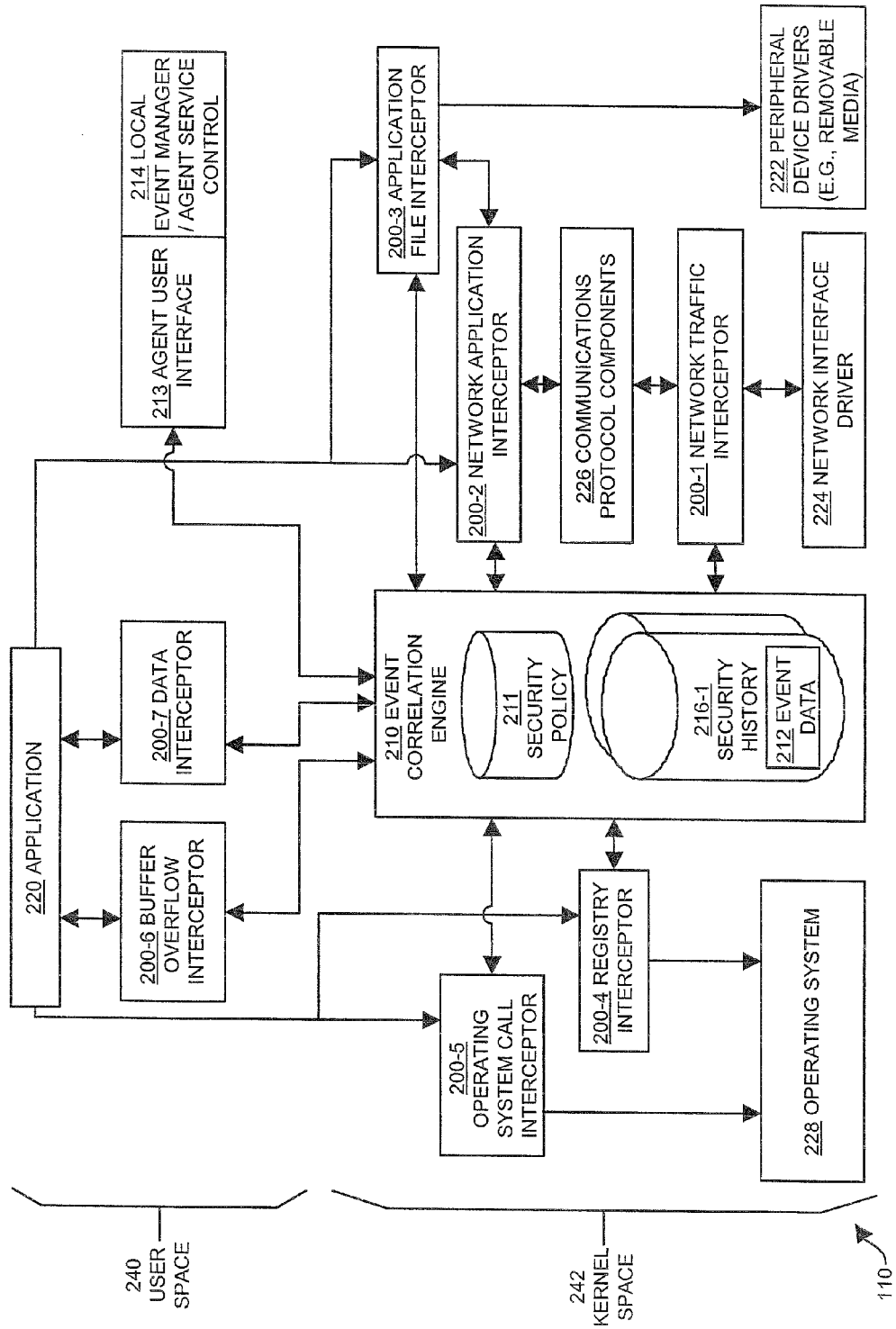
FIG. 2 illustrates example architecture of the computerized device configured with a security system in one example configuration.

FIG. 2 illustrates an architecture of a host computer system 110 configured with a security agent in accordance with one example embodiment. The security agent components include a plurality of security interceptors 200-1 through 200-7 including, for example, a network traffic interceptor 200-1, the network application interceptor 200-2, a file interceptor 200-3, a registry interceptor 200-4, a system call interceptor 200-5, a buffer overflow interceptor 200-6 and a data interceptor 200-7. The agent 150 in this example configuration also includes an event correlation engine 210, a security agent user interface 213, and local event manager 214. The event correlation engine 210 stores a security policy 211 that contains rules that are used to instruct the agent 150 to protects the computer 110 on which it operates by interpreting and enforcing the rules to restrict the operations that may be performed by that computer 110. An administrator 103 uses the management center application 160 to create and distribute security policies to each computer system 110 to be protected.

In one configuration, the network traffic interceptor 200-1 resides between a communications protocol component 226 (such as a TCP driver), and the network interface card 224 or other communications interface. The network traffic interceptor 200-1 looks at data payloads coming from the network before they get to the native operating system TCP stack and can detect malicious operations or instructions such as a remote computer scanning the computer system 110. Such attacks can include, for example, a ping of death attack, a TCP SYN flood attack, port scanning attacks and so froth. Other security interceptors 200 can include data payload interceptors, connection interceptors, file sharing interceptors, data filter interceptors, registry interceptors, system call interceptors, and the like. The interceptors 200 can be installed and executed by using, for example, windows registry keys that create dependencies on standard Operating Systems (OS) dynamically linked libraries (dlls) so that the interceptor dlls 200 are loaded along with the appropriate windows dlls that they monitor. The interceptors can thus serve as wrappers to monitor processing operations of all calls made to any specific computer components.

This example configuration also includes several components that operate within the computer system 110 that are not part of the security agent architecture itself. In particular, this example configuration includes one or more software applications 220 that execute within a user space 240 within the computer system 110. The computer system 110 further operates several components in kernel space 242 such as one or more device peripheral device drivers 222, a network interface driver 224, communications protocol components 226, and an operating system 228. It is to be understood that the components 222 through 228 are illustrated as separate for purposes of description of operations disclosed herein, and that they may be combined together, such as an operating system that includes device drivers 222 and communication protocol components 226.

Generally, according to operations of embodiments disclosed herein, the interceptors 200 monitor processing activities and collect and report event data 212 to the event correlation engine 210 for the respective standard processing components 220 through 228 within the user and kernel spaces 240 and 242. The event correlation engine 210 stores the event data within one or more security histories 216. Event data 212 can include things such as the identification of new connection requests made to the network interface driver 224, as detected by the network traffic interceptor 200-1. As another example, the application file interceptor 200-3 can identify a processing activity such as an application 220 accessing a particular file via an operating system call and report this as event data 212 to the event correlation engine 210. There may be other interceptors 200 besides those illustrated in FIG. 2 and thus the interceptors 201 through 206 are shown by way of example only. The event correlation engine 210 correlates the event data 212 against the security policy 211 in order to provide an indication to the interceptors 200 of whether or not the processing activity associated with the event data should be allowed. The event correlation engine 210 can also instruct the interceptors 200 to collect more or less event data 212 as needed. By being able to track operations, in the event of an undesirable processing operation, the behavior of the computer system 110 can be analyzed and the series of events that took place that lead up the undesirable processing operation can be "fingerprinted" and marked so that if they occur again, they can be prevented prior to their full execution. In addition, by recording traces from multiple failures and determining a commonality between them, if several computer systems suffer similar attacks, a commonality between the attacks can be identified and prevented in the future, even in situations where the attacking program morphs its identity or changes it content.

Figure 3:
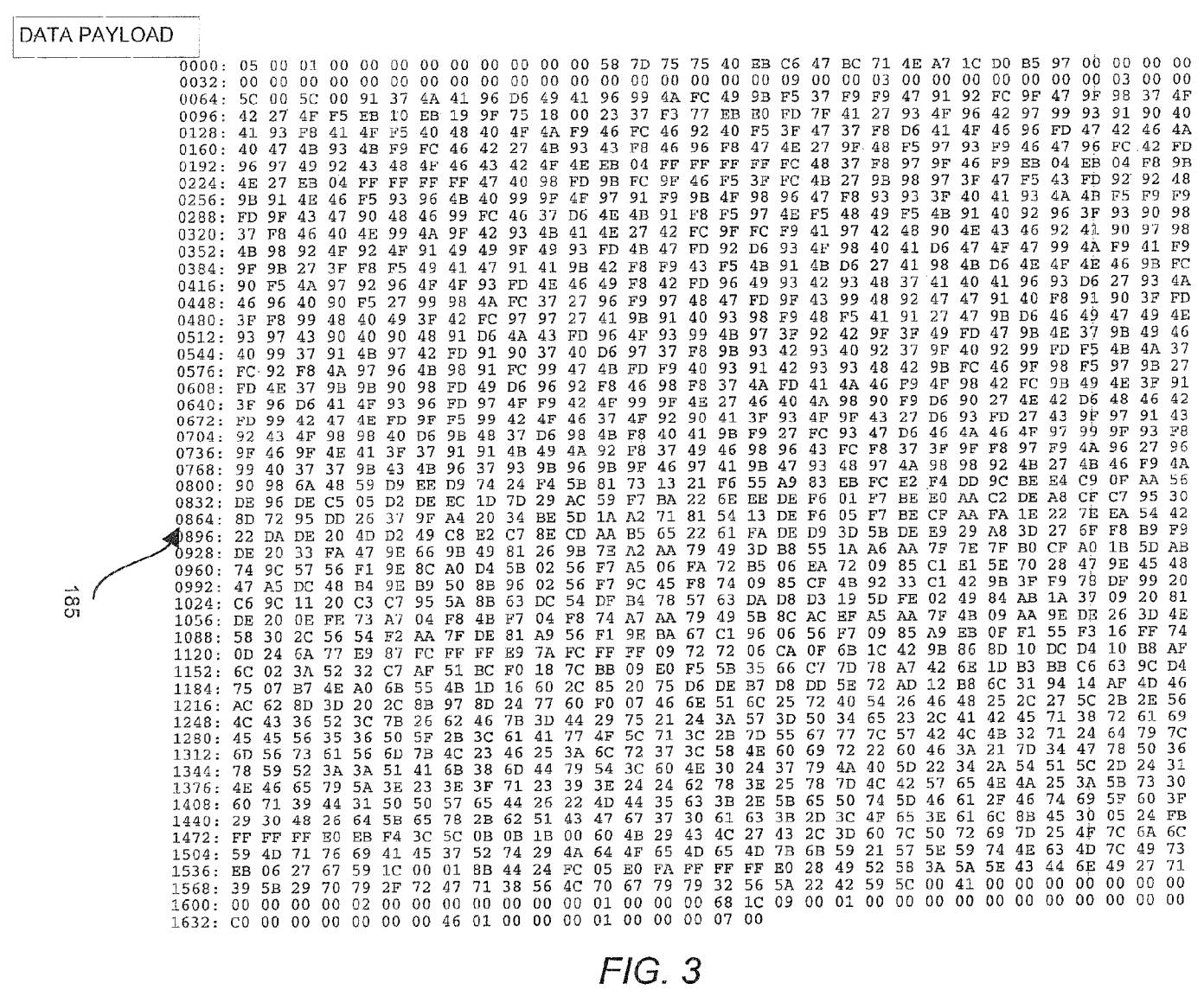

FIG. 3 is an example screenshot of a first data payload 185 containing exploit code. In an example embodiment, the automatic signature security technique 155 can create a signature to exactly match the exploit code in the first data payload 185.

Figure 4:
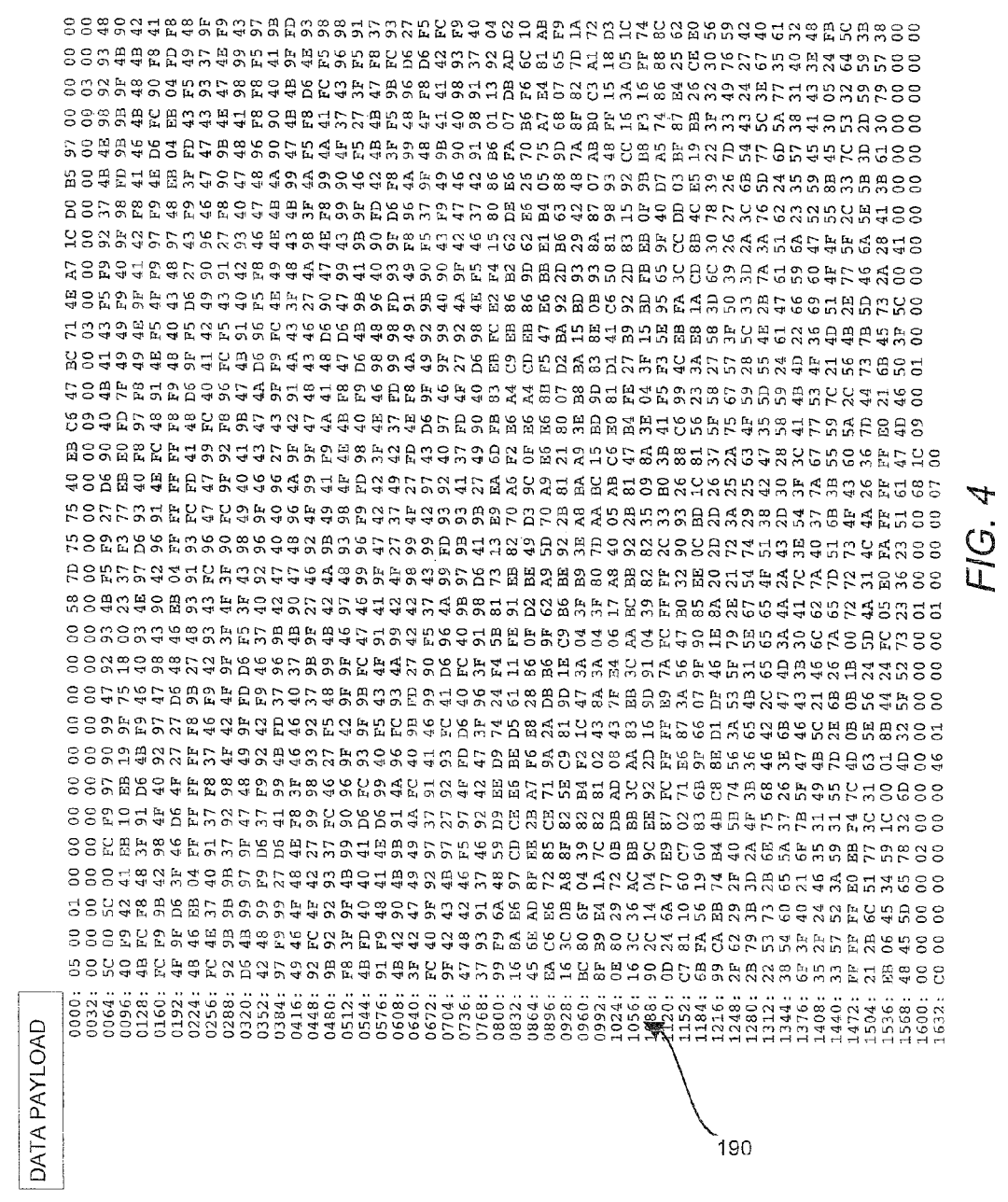

FIG. 4 is an example screenshot of a second data payload 190 containing exploit code. In an example embodiment, the automatic signature security technique 155 identifies that the exploit code in the second data payload 190 is similar to the exploit code in the first data payload 185, but some portions of the exploit code in the first data payload 185 and the second data payload 190 are different. Thus the automatic signature security technique 155 creates a first signature to exactly match the exploit code in the first data payload 185, and a second signature to exactly match the exploit code in the second data payload 192. However, the automatic signature security technique 155 strives to generate an optimal signature that can be applied to both the first data payload 185 and the second data payload 190, and any other subsequent data payloads that contain common portions of code.

FIG. 5 is a screenshot illustrating common sub strings within the first data payload 185 and the second data payload 190. By removing the portions of code in the first data payload 185 and the second data payload 190 that are not common to both data payloads, the automatic signature security technique 155 can isolate the exploit code 180, and identify a signature that is common to both the first data payload 182 and the second data payload 190.

Figure 6:
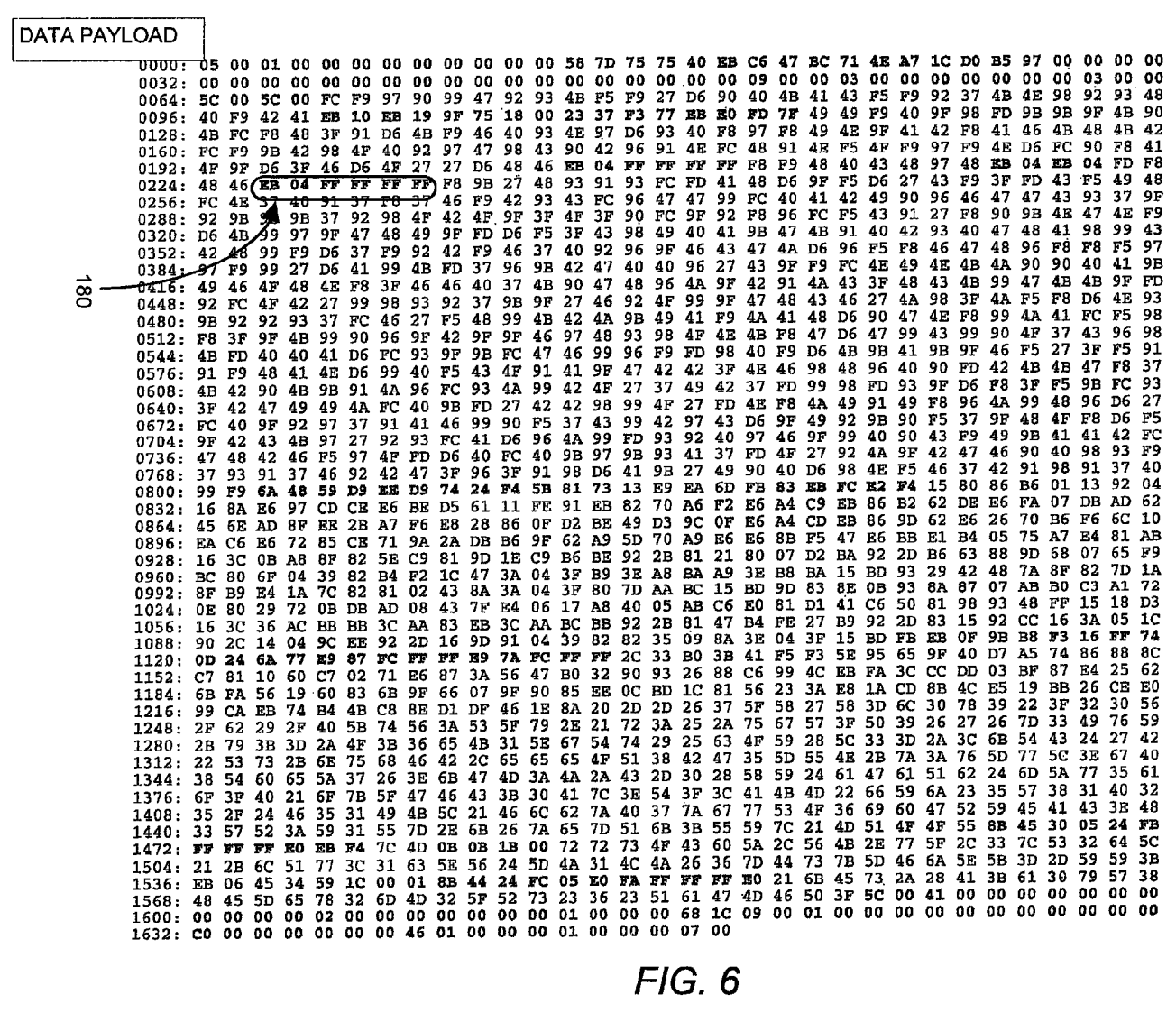

FIG. 6 is a screenshot illustrating mapping the common portions of code of the first data payload 185 onto the second data payload 190 displaying common exploit code 180. The common exploit code 180 is depicted in bolded font.

Further details of configurations explained herein will now be provided with respect to a flow chart of processing steps that show the high level operations disclosed herein. Unless otherwise stated, the steps described below are unordered meaning that, when possible, the steps can be performed in any convenient or desirable order.

Figure 7:
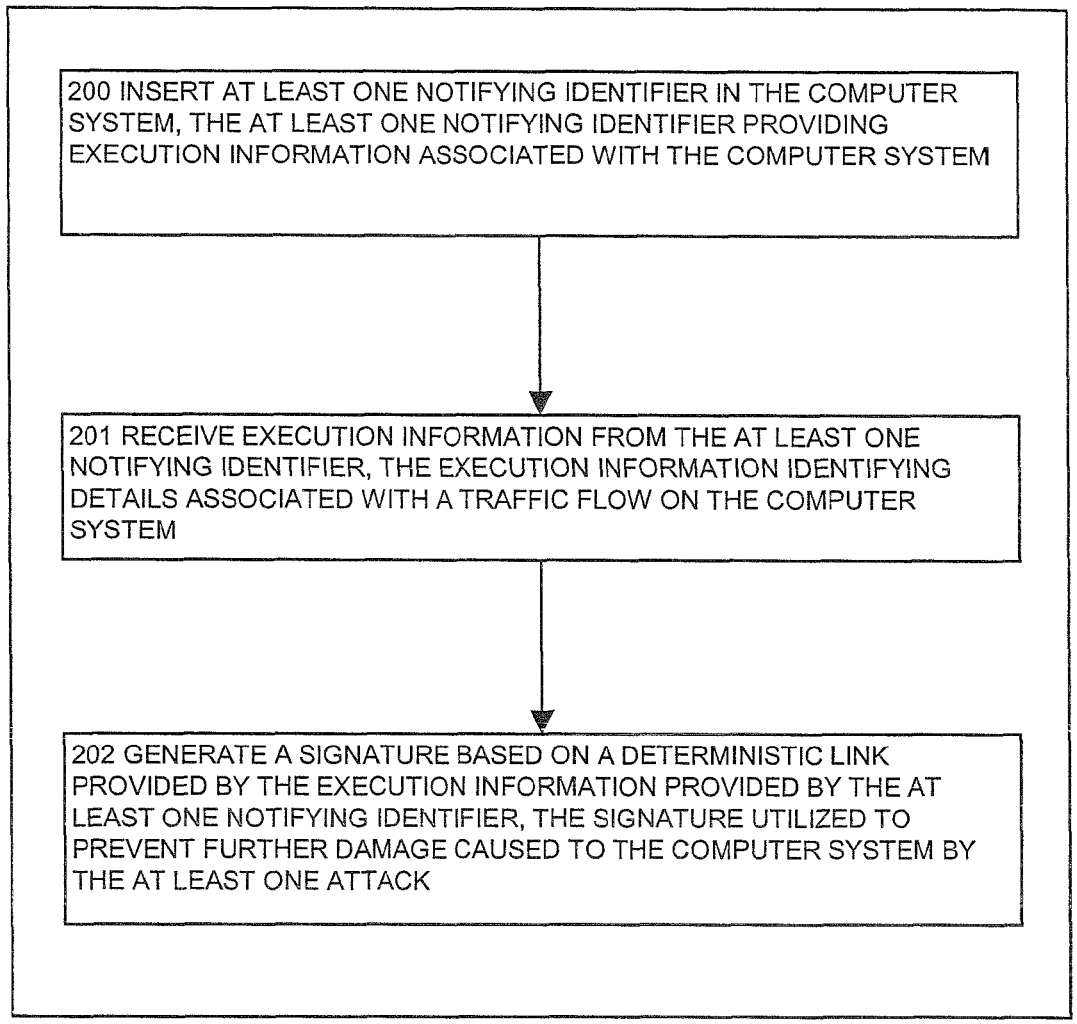
FIG. 7 illustrates a flowchart of a procedure performed by the system of FIG. 1 when the automatic signature security technique inserts at least one notifying identifier in the computer system, the at least one notifying identifier providing execution information associated with the computer system, according to one embodiment disclosed herein.

FIG. 7 is a flowchart of the steps performed by the automatic signature security technique 155 when it inserts at least one notifying identifier in the computer system, the at least one notifying identifier providing execution information associated with the computer system.

In step 200, the automatic signature security technique 155 inserts at least one notifying identifier in the computer system, the at least one notifying identifier providing execution information associated with the computer system. In an example embodiment, the notifying identifier is a 'hook' that is inserted into a function, at, for example, an entry point in the function. The hook (i.e., notifying identifier) provides execution information to the automatic signature security technique 155, as well as providing execution information associated with the state of the computer system at the time of entry into that function during operation of the computer system.

In step 201, the automatic signature security technique 155 receives execution information from the at least one notifying identifier, the execution information identifying details associated with a traffic flow on the computer system. In an example embodiment, the automatic signature security technique 155 inserts a hook (i.e., notifying identifier) into a function, at an entry point in the function. As traffic (i.e., both 'good' traffic, and potentially malicious traffic), the hook (i.e., notifying identifier) provides execution information to the automatic signature security technique 155.

In step 202, the automatic signature security technique 155 generates a signature based on a deterministic link provided by the execution information provided by the at least one notifying identifier, the signature utilized to prevent further damage caused to the computer system by the at least one attack. In an example embodiment, the automatic signature security technique 155 deterministically identifies the data associated with an attack on the computer system. The automatic signature security technique automatically generates a 'local' signature for immediate protection for the data interface that experienced the attack. This signature is used to prevent subsequent attacks. A "locally" generated signature is a signature generated utilizing exploit data local only to the computer system on which the attack occurred.

FIG. 8 is a flowchart of the steps performed by the automatic signature security technique 155 when it inserts at least one notifying identifier in the computer system, the at least one notifying identifier providing execution information associated with the computer system.

In step 203, the automatic signature security technique 155 inserts at least one notifying identifier in the computer system, the at least one notifying identifier providing execution information associated with the computer system. In an example embodiment, the notifying identifier is a 'hook' that is inserted into a function, at, for example, an entry point in the function. The hook (i.e., notifying identifier) provides execution information to the automatic signature security technique 155, as well as providing execution information associated with the state of the computer system at the time of entry into that function during operation of the computer system.

In step 204, the automatic signature security technique 155 utilizes the at least one notifying identifier to filter data processing on the computer system. In an example embodiment, the automatic signature security technique 155 utilizes the notifying identifies to filter data on, for example, public RPC interfaces, or URI filter interfaces.

Alternatively, in step 205, the automatic signature security technique 155 controls a behavior of at least one application on the computer system by the insertion of the at least one notifying identifier in the computer system. In an example embodiment, the automatic signature security technique 155 modifies binary code of a well known exported function to redirect function calls into a security sub routine. The security sub routine performs a set of required security checks, and then executes the original function call code. This technique may be used to modify not only drivers, but also application or DLL entry points. Thus, the control points are used to monitor behavior, as well as control access.

Figure 9:
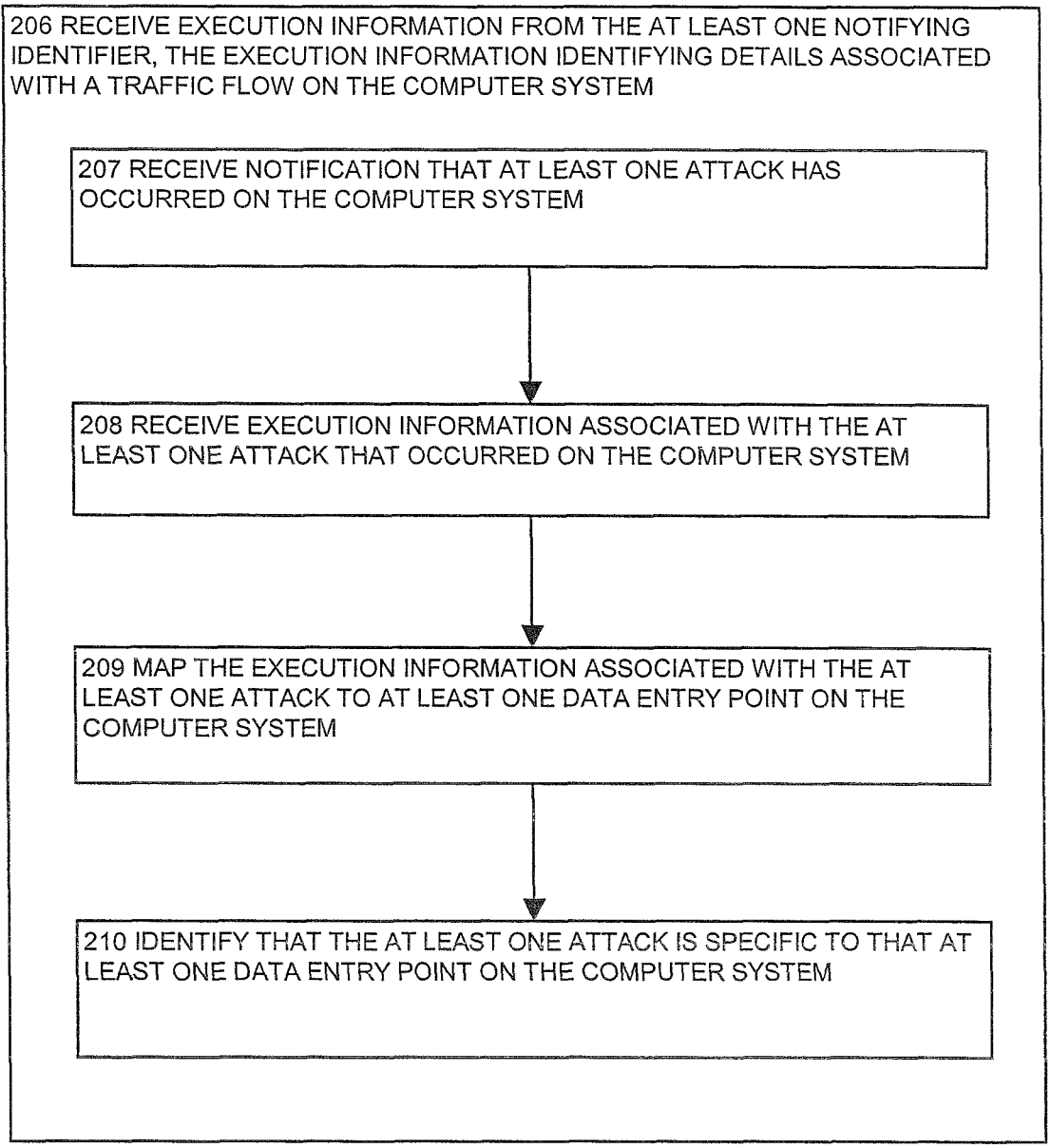
FIG. 9 illustrates a flowchart of a procedure performed by the system of FIG. 1 when the automatic signature security technique receives execution information from the at least one notifying identifier, the execution information identifying details associated with a traffic flow on the computer system, according to one embodiment disclosed herein.

FIG. 9 is a flowchart of the steps performed by the automatic signature security technique 155 when it receives execution information from the at least one notifying identifier, the execution information identifying details associated with a traffic flow on the computer system.

In step 206, the automatic signature security technique 155 receives execution information from the at least one notifying identifier, the execution information identifying details associated with a traffic flow on the computer system. In an example embodiment, the automatic signature security technique 155 inserts a hook (i.e., notifying identifier) into a function, at an entry point in the function. As traffic (i.e., both 'good' traffic, and potentially malicious traffic), travels throughout the computer system, the hook (i.e., notifying identifier) provides execution information to the automatic signature security technique 155.

In step 207, the automatic signature security technique 155 receives notification that at least one attack has occurred on the computer system. In an example embodiment, the security agent 150 makes use of centrally defined security policies to enforce both static and behavioral controls over these types of system resources. The policies are tasked to stop "Day Zero" exploits at some point of execution. However, it is desirable to stop the exploit at the earliest possible time, to limit or prevent damage from occurring to the computer system as a result of the attack. The automatic signature security technique 155 detects a policy violation, determines a root cause of the policy violation (i.e., the attack on the computer system), and attempts to prevent the exploit from occurring again. Thus, the automatic signature security technique 155 receives notification, from at least one of the control points, that an attack has been identified on one of the interfaces on which a control point has been established. In an example embodiment, the attack is an unintended failure, such as incorrectly written code executing on the computer system. In this example, the incorrectly written code does not have malicious intent, but inadvertently causes a failure on the computer system triggering the automatic signature security technique 155. In another example embodiment, the attack can include at least one of a policy violation, an application failure and a transaction failure.

In step 208, the automatic signature security technique 155 receives execution information associated with the at least one attack that occurred on the computer system. In an example configuration, the automatic signature security technique 155 receives a first data payload 185 containing binary code thought to be the source of the attack at a data interface, on the computer system.

In step 209, the automatic signature security technique 155 maps the execution information associated with the at least one attack to at least one data entry point on the computer system. In an example configuration, a system or application triggers one of a class of policy violations, where a deterministic association can be mapped from the attack back to a "data entry" control point (i.e., Buffer Overflow, process exception, etc.). The data processed by the thread is identified as an exploit specific to this interface. The data and thread can be associated at the beginning of the data processing (and temporarily stored), or the data may actually be passed along to the point of the policy violation.

In step 210, the automatic signature security technique 155 identifies that the at least one attack is specific to that at least one data entry point on the computer system. In an example configuration, the automatic signature security technique 155, detects an attack occurring on the computer system, maps the execution information associated with the attack to a data entry point on the computer system, and identifies that the attack is specific to the data entry point to which the attack was mapped.

FIG. 10 is a flowchart of the steps performed by the automatic signature security technique 155 when it generates a signature based on a deterministic link provided by the execution information provided by the at least one notifying identifier, the signature utilized to prevent further damage caused to the computer system by at least one attack In step 211, the automatic signature security technique 155 generates a signature based on a deterministic link provided by the execution information provided by the at least one notifying identifier, the signature utilized to prevent further damage caused to the computer system by at least one attack. In an example embodiment, the automatic signature security technique 155 deterministically identifies the data associated with an attack on the computer system. The automatic signature security technique automatically generates a 'local' signature for immediate protection for the data interface that experienced the attack. This signature is used to prevent subsequent attacks. A "locally" generated signature is a signature generated utilizing exploit data local only to the computer system on which the attack occurred.

In step 212, the automatic signature security technique 155 generates the signature by matching the signature against at least a portion of a data payload associated with the at least one attack. In an example configuration, the automatic signature security technique 155 identifies a portion of the attack. The automatic signature security technique 155 identifies the attack is similar to, but not exactly like, previous attacks. Thus, the automatic signature security technique 155 generates a signature by matching common portions of repeated attacks. In this example, it is possible that the attack is a polymorphic attack, capable of modifying itself with each repeated attack. Thus any signature generated by the automatic signature security technique 155 to exactly match each instance of the attack, would only prevent that exact match, and not the repeated polymorphic attempts of the same attack.

In step 213, the automatic signature security technique 155 generates the signature by matching the signature exactly against the at least one attack. In an example embodiment, the automatic signature security technique 155 identifies an attack occurring on the computer system. The automatic signature security technique 155 generates a signature that matches the attack exactly. Thus, this generated signature will prevent a subsequent occurrence of only this exact attack.

FIG. 11 is a flowchart of a continuation of FIG. 10 of the steps performed by the automatic signature security technique 155 when it generates the signature by matching the signature against at least a portion of a data payload associated with the at least one attack.

In step 214, the automatic signature security technique 155 refines the signature utilizing the traffic flow on the computer system to generate the signature. In an example configuration, the automatic signature security technique 155 has identified an attack on the computer system and generated a signature. The automatic signature security technique 155 utilizes traffic (both good data payloads and bad/suspicious data payloads) on the computer system to further refine the signature. The identification of a good data payload enables the automatic signature security technique 155 to further refine the signature by removing elements of the signature that are matched to known good data payloads.

In step 215, the automatic signature security technique 155 receives the plurality of data payloads from at least one computer system to create an optimal signature that is operational on the at least one computer system. In an example configuration, the automatic signature security technique 155 refines the generated signature by using signatures provided by a plurality of computer systems. The resulting generated optimal signature is transmitted to the plurality of computer systems such that all the computer systems within the plurality of computer systems have access to this optimal signature. In another example embodiment, the automatic signature security technique 155 refines the generated signature by using signatures provided by a plurality of computer systems. The resulting generated optimal signature is then used locally on the computer system. In an example embodiment, the automatic signature security technique 155 receives a plurality of signatures from at least one computer system to create an optimal signature that is operational on the at least one computer system.

FIG. 12 is a flowchart of a continuation of FIG. 11 of the steps performed by the automatic signature security technique 155 when it receives the plurality of data payloads from at least one computer system to create an optimal signature that is operational on the at least one computer system.

In step 217, the automatic signature security technique 155 identifies an sequence of at least one sub string from the plurality of data payloads on the at least one computer system. In an example configuration, the automatic signature security technique 155 generates a Longest Common Token Sequence Signature (LCTS). The automatic signature security technique 155 identifies an ordered sequence of sub strings common to a plurality of data payloads. When applied against any signatures from the plurality of data payloads used to build a LCTS signature, the LCTS signature will match every signature. Depending on the amount of common sub strings between signatures, the commonality can range from every byte (when all the signatures are same) to zero bytes when signatures don't have any similarity. In one embodiment, a sub string is considered common only if it is found in proper order in all signatures used for signature generation. In an example embodiment, the at least one sub string can include at least one of an ordered sequence, a single longest string, a longest set of unordered sub strings, a longest set of ordered sub strings and a set of sub strings with probabilities assigned.

Alternatively, in step 218, the automatic signature security technique 155 identifies a common sub string from the plurality of data payloads on the at least one computer system. In an example configuration, the automatic signature security technique 155 generates a Longest Common Sub string Signature (LCS) The automatic signature security technique 155 identifies a contiguous string that is common to a plurality of data payloads such that any signature from the plurality of data payloads will match the LCS signature. In one embodiment, the LCS signature is not used with polymorphic worms. In this example, an LCTS signature is used instead. In an example embodiment, the common sub string from the plurality of data payloads can include a sequence or set of sub strings that are the same in length.

Alternatively, in step 219, the automatic signature security technique 155 identifies a collection of sub strings from some of the plurality of data payloads on the at least one computer system. In an example configuration, the automatic signature security technique 155 generates a Distinct Common Sub strings Signature by identifying a collection of sub strings from some of the plurality of data payloads on the computer system. For example, the collection of sub strings may only represent twenty five percent of the plurality of data payloads on the computer system.

In step 220, the automatic signature security technique 155 assigns a probability to each of the sub strings within the collection of sub strings. In an example configuration, the automatic signature security technique 155 calculates the probability based on the frequency of the sub string occurring in good and bad data payloads from a plurality of data payloads used to generate the plurality of data payloads.

In step 221, the automatic signature security technique 155 associates the probability to a likelihood that a data payload associated with each of the sub strings is one of the group consisting of a good data payload and a bad data payload. In an example configuration, the automatic signature security technique 155 identifies good data payloads and bad data payloads that were used to generate the signatures. Both the good data payloads and bad data payloads contained the identified sub strings. The automatic signature security technique 155 associates a probability to each sub string. That probability identifies the likelihood that each of the identified sub strings is associated with a good data payload or a bad data payload.

FIG. 13 is a flowchart of the steps performed by the automatic signature security technique 155 when it generates a signature based on a deterministic link provided by the execution information provided by the at least one notifying identifier, the signature utilized to prevent further damage caused to the computer system by at least one attack In step 222, the automatic signature security technique 155 generates a signature based on a deterministic link provided by the execution information provided by the at least one notifying identifier, the signature utilized to prevent further damage caused to the computer system by at least one attack. In an example embodiment, the automatic signature security technique 155 deterministically identifies the data associated with an attack on the computer system. The automatic signature security technique automatically generates a 'local' signature for immediate protection for the data interface that experienced the attack. This signature is used to prevent subsequent attacks. A "locally" generated signature is a signature generated utilizing exploit data local only to the computer system on which the attack occurred.

In step 223, the automatic signature security technique 155 receives a data payload on the computer system. In an example embodiment, the automatic signature security technique 155 is monitoring the computer system and detects an incoming data payload on the computer system.

In step 224, the automatic signature security technique 155 compares the data payload to the signature. In an example embodiment, the automatic signature security technique 155 detects an incoming data payload on the computer system, and compares the incoming data payload to a generated signature.

In step 225, the automatic signature security technique 155 denies the data payload access to the computer system based on the comparison of the data payload to the signature. In an example embodiment, the automatic signature security technique 155 detects an incoming data payload on the computer system, and compares the incoming data payload to a generated signature. The automatic signature security technique 155 determines the incoming data payload matches the generated signature, and identifies the incoming data payload as a known attack. The automatic signature security technique then denies the incoming data payload access to the computer system, based on the comparison of the incoming data payload to the signature.

While the system and method have been particularly shown and described with references to configurations thereof, it will be understood by those skilled in the art that various changes in form and details may be made therein without departing from the scope of the embodiments disclosed herein encompassed by the appended claims. Accordingly, the present embodiments disclosed herein are not intended to be limited by the example configurations provided above.

What is claimed is:

1. A method of providing computer security on a computer system, the method comprising:
    inserting at least one notifying identifier in at least one computer system, the at least one notifying identifier providing execution information associated with the at least one computer system;
receiving execution information from the at least one notifying identifier, the execution information identifying details associated with a traffic flow comprising a plurality of data flows on the at least one computer system;
generating a signature by matching the signature against at least a portion of a data payload associated with at least one attack;
identifying a common sub-string from the plurality of data payloads on the at least one computer system; and
refining the signature based on the common sub-string identified from the plurality of data payloads on the at least one computer system, the refined signature utilized to prevent further damage caused to the at least one computer system by the at least one attack.

2. The method of claim 1 wherein inserting at least one notifying identifier in the at least one computer system, the at least one notifying identifier providing execution information associated with the at least one computer system comprises:
    utilizing the at least one notifying identifier to filter data processing on the at least one computer system.

3. The method of claim 1 wherein inserting at least one notifying identifier in the at least one computer system, the at least one notifying identifier providing execution information associated with the computer system comprises:
    controlling a behavior of at least one application on the at least one computer system by the insertion of the at least one notifying identifier in the at least one computer system.

4. The method of claim 1 wherein receiving execution information from the at least one notifying identifier, the execution information identifying details associated with a traffic flow on the at least one computer system comprises:
    receiving notification that at least one attack has occurred on the at least one computer system; and
    receiving execution information associated with the at least one attack that occurred on the at least one computer system;
    mapping the execution information associated with the at least one attack to at least one data entry point on the at least one computer system; and
    identifying that the at least one attack is specific to that at least one data entry point on the at least one computer system.

5. The method of claim 1 wherein generating the signature by matching the signature against at least a portion of a data payload associated with the at least one attack comprises:
    generating the signature by matching the signature exactly against the at least one attack.

6. The method of claim 1 wherein refining the signature comprises:

receiving the plurality of data payloads from at least one computer system to create an optimal signature that is operational on the at least one computer system.

7. The method of claim 6 wherein receiving the plurality of data payloads from at least one computer system to create an optimal signature that is operational on the at least one computer system comprises:
  identifying a sequence of at least one sub-string from the plurality of data payloads on the at least one computer system.

8. The method of claim 6 wherein receiving the plurality of data payloads from at least one computer system to create an optimal signature that is operational on the at least one computer system comprises:
  identifying a collection of sub-strings from some of the plurality of data payloads on the at least one computer system;
assigning a probability to each of the sub-strings within the collection of sub-strings; and
  associating the probability to a likelihood that a data payload associated with each of the sub-strings is one of the group consisting of a good data payload and a bad data payload.

9. The method of claim 1 comprising:
receiving a data payload on the computer system;
comparing the data payload to the refined signature; and
denying the data payload access to the computer system based on the comparison of the data payload to the refined signature.

10. A computerized device comprising:
a memory;
a processor;
a communications interface;
an interconnection mechanism coupling the memory, the processor and the communications interface;
  wherein the memory is encoded with a signature generating application that when executed on the processor is capable of providing computer security on the computerized device by performing the operations of:
inserting at least one notifying identifier in at least one computer system, the at least one notifying identifier providing execution information associated with the at least one computer system;
receiving execution information from the at least one notifying identifier, the execution information identifying details associated with a traffic flow comprising a plurality of data flows on the at least one computer system;
generating a signature by matching the signature against at least a portion of a data payload associated with at least one attack;
identifying a common sub-string from the plurality of data payloads on the at least one computer system; and
refining the signature based on the common sub-string identified from the plurality of data payloads on the at least one computer system, the refined signature utilized to prevent further damage caused to the at least one computer system by the at least one attack.

11. The computerized device of claim 10 wherein when the computerized device performs the operation of inserting at least one notifying identifier in the at least one computer system, the at least one notifying identifier providing execution information associated with the at least one computer system, the computerized device is capable of performing the operation of:
  utilizing the at least one notifying identifier to filter data processing on the at least one computer system.

12. The computerized device of claim 10 wherein when the computerized device performs the operation of refining the signature, the computerized device is capable of performing the operation of:
  receiving the plurality of data payloads from the at least one computer system to create an optimal signature that is operational on the at least one computer system.

13. The computerized device of claim 12 wherein when the computerized device performs the operation of receiving the plurality of data payloads from at least one computer system to create an optimal signature that is operational on the at least one computer system, the computerized device is capable of performing the operations of:
  identifying a collection of sub-strings from some of the plurality of data payloads on the at least one computer system;
  assigning a probability to each of the sub-strings within the collection of sub-strings; and
  associating the probability to a likelihood that a data payload associated with each of the sub-strings is one of the group consisting of a good data payload and a bad data payload.

14. The computerized device of claim 12 wherein when the computerized device performs the operation of receiving the plurality of data payloads from at least one computer system to create an optimal signature that is operational on the at least one computer system, the computerized device is capable of performing the operation of:
  identifying an sequence of at least one sub-string from the plurality of data payloads on the at least one computer system.

15. A non-transitory computer readable medium encoded with computer programming logic that when executed on a process in a computerized device provides computer security, the medium comprising:
  instructions for inserting at least one notifying identifier in at least one computer system, the at least one notifying identifier providing execution information associated with the at least one computer system;
  instructions for receiving execution information from the at least one notifying identifier, the execution information identifying details associated with a traffic flow comprising a plurality of data flows on the at least one computer system;
  instructions for generating a signature by matching the signature against at least a portion of a data payload associated with at least one attack;
  instructions for identifying a common sub-string from the plurality of data payloads on the at least one computer system; and
  instructions for refining the signature based on a the common sub-string identified from the plurality of data payloads on the at least one computer system, the refined signature utilized to prevent further damage caused to the at least one computer system by the at least one attack.

16. The non-transitory computer-readable medium of claim 15, wherein the instructions for inserting at least one notifying identifier in the at least one computer system, the at least one notifying identifier providing execution information associated with the at least one computer system comprise instructions for:
  utilizing the at least one notifying identifier to filter data processing on the at least one computer system.

17. The non-transitory computer-readable medium of claim 15 wherein when the instructions for refining the signature comprise instructions for:

receiving the plurality of data payloads from the at least one computer system to create an optimal signature that is operational on the at least one computer system.

18. The non-transitory computer-readable medium of claim 17 wherein instructions for receiving the plurality of data payloads from at least one computer system to create an optimal signature that is operational on the at least one computer system comprise instructions for:

identifying a collection of sub-strings from some of the plurality of data payloads on the at least one computer system;

assigning a probability to each of the sub-strings within the collection of sub-strings; and associating the probability to a likelihood that a data payload associated with each of the sub-strings is one of the group consisting of a good data payload and a bad data payload.

19. The non-transitory computer-readable medium of claim 15, the medium further comprising:

instructions for receiving a data payload on the at least one computer system;

instructions for comparing the data payload to the refined signature; and instructions for denying the data payload access to the at least one computer system based on the comparison of the data payload to the refined signature.

\* \* \* \* \*